United States Patent
Kim et al.

(10) Patent No.: US 9,496,995 B2
(45) Date of Patent: Nov. 15, 2016

(54) METHOD AND APPARATUS FOR REPORTING CHANNEL STATE IN MULTI-CARRIER SYSTEM

(75) Inventors: So Yeon Kim, Anyang-si (KR); Jae Hoon Chung, Anyang-si (KR); Yeong Hyeon Kwon, Anyang-si (KR); Hyun Soo Ko, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 986 days.

(21) Appl. No.: 13/254,452

(22) PCT Filed: Mar. 3, 2010

(86) PCT No.: PCT/KR2010/001325
§ 371 (c)(1),
(2), (4) Date: Sep. 1, 2011

(87) PCT Pub. No.: WO2010/101409
PCT Pub. Date: Sep. 10, 2010

(65) Prior Publication Data
US 2011/0317652 A1   Dec. 29, 2011

Related U.S. Application Data

(60) Provisional application No. 61/157,539, filed on Mar. 4, 2009.

(30) Foreign Application Priority Data

Mar. 3, 2010   (KR) .................. 10-2010-0018894

(51) Int. Cl.
*H04W 72/08* (2009.01)
*H04L 5/00* (2006.01)
*H04W 24/10* (2009.01)

(52) U.S. Cl.
CPC ............. *H04L 5/001* (2013.01); *H04L 5/0057* (2013.01); *H04W 24/10* (2013.01); *H04L 5/0048* (2013.01); *H04L 5/0098* (2013.01)

(58) Field of Classification Search
CPC . H04L 1/0026; H04L 5/0057; H04L 1/0025; H04L 27/2601; H04L 5/0044; H04L 5/001; H04L 5/0098; H04L 5/0048; H04B 7/0632; H04W 24/10
USPC ......... 370/329, 341, 431, 437, 468; 455/450
See application file for complete search history.

(56) References Cited

U.S. PATENT DOCUMENTS

2005/0201295 A1\* 9/2005 Kim et al. .................... 370/241
2005/0207367 A1 9/2005 Onggosanusi et al.
(Continued)

FOREIGN PATENT DOCUMENTS

CN   101243625   8/2008
EP   1906569   4/2008
(Continued)

OTHER PUBLICATIONS

NTT DoCoMo, "Initial Access Procedure for Asymmetric Wider Bandwidth in LTE Advanced," 3GPP TSG RAN WG1 Meeting #56, R1-090897, Feb. 2009, 5 pages.
(Continued)

*Primary Examiner* — Hoang-Chuong Vu
(74) *Attorney, Agent, or Firm* — Lee, Hong, Degerman, Kang & Walmey; Jonathan Kang; Michael Monaco

(57) ABSTRACT

A method and an apparatus for reporting a channel state in a multi-carrier system are provided. User equipment receives an uplink grant including an uplink resource allocation and a channel quality indicator (CQI) request via one downlink carrier from among a plurality of downlink carriers. The user equipment reports CQIs for the plurality of downlink carriers via a plurality of subframes in accordance with the CQI request.

20 Claims, 10 Drawing Sheets

(56) References Cited

U.S. PATENT DOCUMENTS

| | | | |
|---|---|---|---|
| 2009/0196190 A1* | 8/2009 | Li et al. | 370/252 |
| 2010/0098012 A1* | 4/2010 | Bala et al. | 370/329 |
| 2010/0118817 A1* | 5/2010 | Damnjanovic et al. | 370/329 |
| 2010/0172428 A1* | 7/2010 | Pani | H04L 1/0026 375/262 |
| 2011/0268067 A1* | 11/2011 | Seo et al. | 370/329 |
| 2012/0026950 A1* | 2/2012 | Kotecha | 370/329 |
| 2012/0120838 A1* | 5/2012 | Farajidana et al. | 370/252 |
| 2014/0016506 A1* | 1/2014 | Gauvreau et al. | 370/254 |

FOREIGN PATENT DOCUMENTS

| | | |
|---|---|---|
| JP | 2008-538061 | 10/2008 |
| JP | 2010-522461 | 7/2010 |
| JP | 2014-30223 | 2/2014 |
| KR | 10-2008-0045137 | 5/2008 |
| WO | 2007/020994 | 2/2007 |
| WO | 2008/115110 | 9/2008 |

OTHER PUBLICATIONS

3rd Generation Partnership Project (3GPP), "Technical Specification Group Radio Access Network; Evolved Universal Terrestrial Radio Access (E-UTRA); Multiplexing and channel coding (Release 8)," 3GPP TS 36.212 V8.5.0, Dec. 2008, 58 pages.

3rd Generation Partnership Project (3GPP), "Technical Specification Group Radio Access Network; Evolved Universal Terrestrial Radio Access (E-UTRA); Physical layer procedures (Release 8)," 3GPP TS 36.213 V8.5.0, Dec. 2008, 74 pages.

Japan Patent Office Application Serial No. 2011-551994, Final Office Action dated May 21, 2013, 2 pages.

3rd Generation Partnership Project (3GPP), Technical Specification Group Radio Access Networks; Evolved Universal Terrestrial Radio Access (E-UTRA); Physical layer procedures (Release 8), 3GPP TS 36.213 V8.5.0, Dec. 2008, 74 pages.

LG Electronics, "Uplink control channel transmission for LTE-Advanced," 3GPP TSG RAN WG1 #56, R1-090656, Feb. 2009, 5 pages.

European Patent Office Application No. 10748951.0, Search Report dated Dec. 4, 2015, 7 pages.

3rd Generation Partnership Project, "Technical Specification Group Radio Access Network; Evolved Universal Terrestrial Radio Access (E-UTRA); Physical layer procedures", 3GPP TS 36.213 v8.6.0, Mar. 2009, 80 pages.

3rd Generation Partnership Project, "Technical Specification Group Radio Access Network; Evolved Universal Terrestrial Radio Access (E-UTRA); Physical Channels and Modulation", 3GPP TS 36.211 v8.6.0, Mar. 2009, 83 pages.

\* cited by examiner

METHOD AND APPARATUS FOR REPORTING CHANNEL STATE IN MULTI-CARRIER SYSTEM

CROSS-REFERENCE TO RELATED APPLICATIONS

This application is the National Stage filing under 35 U.S,C. 371 of International Application No. PCT/KR2010/001325, filed on Mar. 3, 2010, which claims the benefit of earlier filing date and right of priority to Korean Application No. 10-2010-0018894, filed on Mar. 3, 2010, and also claims the benefit of U.S. Provisional Application No. 61/157,539, filed on Mar. 4, 2009, the contents of which are all hereby incorporated by reference herein in their entirety.

TECHNICAL FIELD

The present invention relates to wireless communication and, more particularly, to a method and apparatus for reporting a channel state in a wireless communication system supporting multiple carriers.

BACKGROUND ART

Wireless communication systems are widely deployed in order to provide various kinds of communication services, such as voice and data. In general, the wireless communication systems are multiple access systems which can share available system resources (e.g., bandwidths and transmission power) and support communication with multiple users. The multiple access systems may include, for example, a CDMA (code division multiple access) system, a FDMA (frequency division multiple access) system, a TDMA (time division multiple access) system, an OFDMA (orthogonal frequency division multiple access) system, and an SC-FDMA (single carrier frequency division multiple access) system.

In a common wireless communication system, although the bandwidth of uplink and the bandwidth of downlink are differently set, only one carrier is chiefly taken into consideration. The carrier is defined by a center frequency and a bandwidth. A multi-carrier system uses a plurality of carriers having a bandwidth smaller than the entire bandwidth.

LTE (long term evolution) based on 3GPP (3rd Generation Partnership Project) TS (Technical Specification) Release 8 is the leading next-generation mobile communication standard.

As disclosed in 3GPP TS 36.211 V8.5.0 (2008-12) "Evolved Universal Terrestrial Radio Access (E-UTRA); Physical Channels and Modulation (Release 8)", physical channels in LTE may be divided into a PDSCH (Physical Downlink Shared Channel) and a PUSCH (Physical Uplink Shared Channel) which are data channels and a PDCCH (Physical Downlink Control Channel), a PCFICH (Physical Control Format Indicator Channel), a PHICH (Physical Hybrid-ARQ Indicator Channel), and a PUCCH (Physical Uplink Control Channel) which are control channels.

A 3GPP LTE system supports only one (i.e., one carrier) of {1.4, 3, 5, 10, 15, and 20} MHz bandwidths. A multi-carrier system may use two carriers, each having a 20 MHz bandwidth, or three carriers having a 20 MHz bandwidth, a 15 MHz bandwidth, and a 5 MHz bandwidth, respectively, in order to support the entire 40 MHz bandwidth.

A multi-carrier system has advantages in that it can support backward compatibility with the existing system and also increase the data rate through multiple carriers.

In a single carrier system, control channels and data channels are designed based on a single carrier. In a multi-carrier system, however, it may be inefficient if the channel structure of the single carrier system is used without change.

A CQI (Channel Quality Indicator) indicates a channel condition. The CQI is used in order for a base station to schedule UEs within a cell. In order to schedule each of carriers in a multi-carrier system, a CQI is necessary for each carrier. If CQIs for all the carriers are reported, however, radio resources may be inefficiently used.

It is required a method and apparatus capable of reporting a CQI in a multi-carrier system.

DISCLOSURE

Technical Problem

The present invention provides a method and apparatus for supporting multiple carriers.

The present invention also provides a method and apparatus for monitoring a control channel in a multi-carrier system.

Technical Solution

In an aspect, a method of reporting a channel state in a multi-carrier system is provided. The method includes receiving, by an user equipment, an uplink grant including an uplink resource allocation and a channel quality indicator (CQI) request through one of a plurality of downlink carriers, and reporting, by the user equipment, a CQI for the plurality of downlink carriers over a plurality of subframes in response to the CQI request.

A CQI for each of the plurality of downlink carriers may be reported in each of the plurality of subframes.

The plurality of subframes may be spaced apart from one another at offset intervals.

In another aspect, an user equipment of reporting a channel state in a multi-carrier system includes a radio frequency (RF) unit configured to transmit and receive a radio signal, and a processor operatively connected to the RF unit and configured to receive an uplink grant including an uplink resource allocation and a channel quality indicator (CQI) request through one of a plurality of downlink carriers and report a CQI for the plurality of downlink carriers over a plurality of subframes in response to the CQI request.

Advantageous Effects

While the structure of the existing 3GPP LTE remains intact, a channel condition for a plurality of carriers can be reported. A channel condition for a plurality of carriers can be reported without an additional uplink grant.

MODE FOR INVENTION

Figure 1:
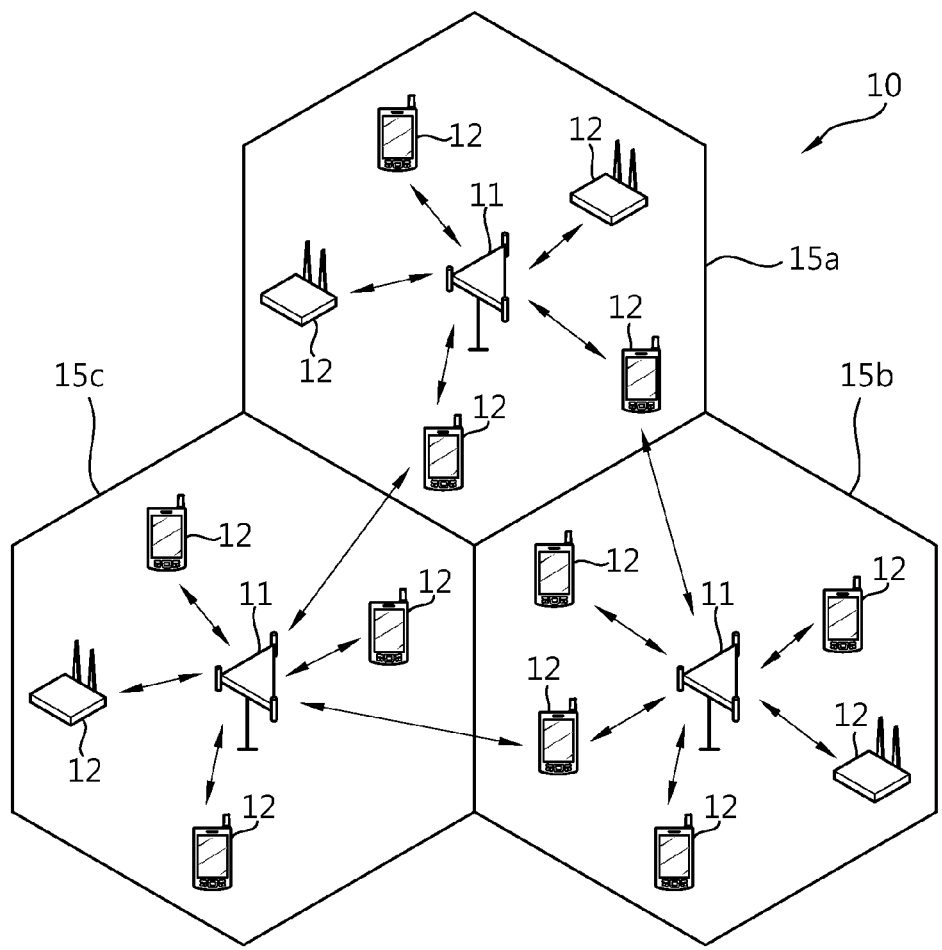
FIG. 1 shows a wireless communication system.

FIG. 1 shows a wireless communication system. A wireless communication system 10 includes one or more base stations (BSs) 11. The BSs 11 provide communication services to respective geographical regions (commonly called cells) 15a, 15b, and 15c. The cell may be divided into a number of regions (called sectors).

A user equipment (UE) 12 may be fixed or mobile. The UE may be called another terminology, such as an MS (mobile station), an MT (mobile terminal), a UT (user terminal), an SS (subscriber station), a wireless device, a PDA (personal digital assistant), a wireless modem, or a handheld device.

The BS 11 commonly refers to a fixed station which communicates with the UEs 12. The BS may also be called another terminology, such as an eNB (evolved-NodeB), a BTS (Base Transceiver System), or an access point.

Hereinafter, downlink (DL) refers to communication from a BS to a UE, and uplink (UL) refers to communication from a UE to a BS. In downlink, a transmitter may be a part of a BS, and a receiver may be a part of a UE. In uplink, a transmitter may be a part of a UE, and a receiver may be a part of a BS.

Figure 2:
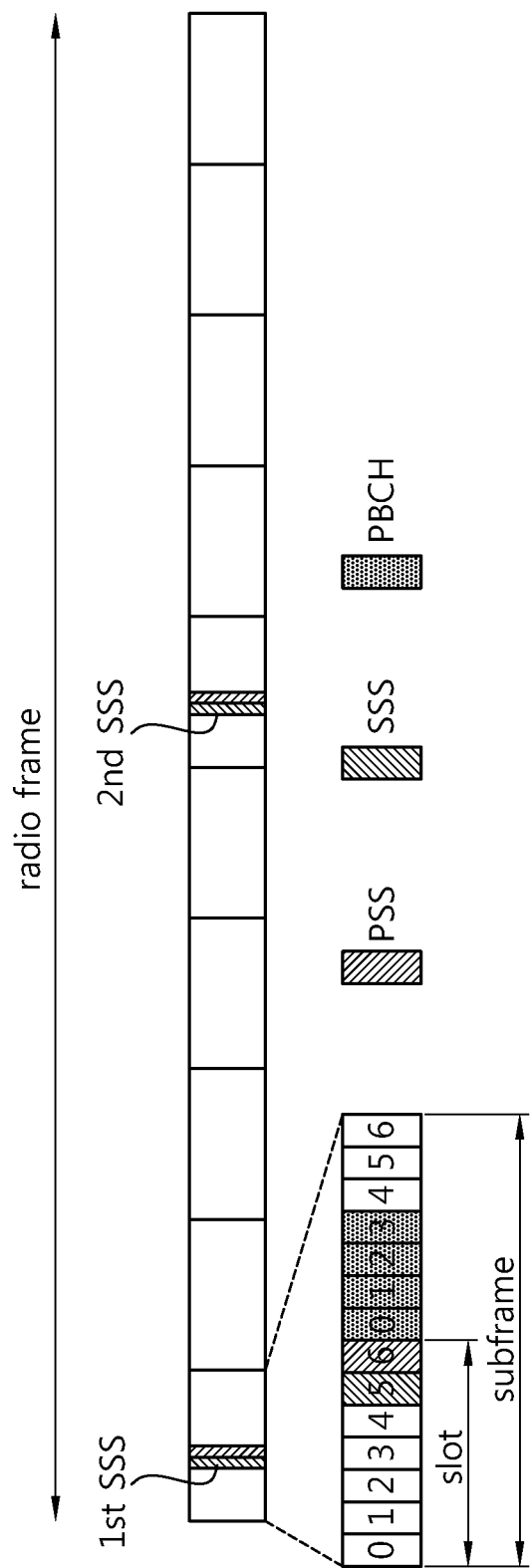
FIG. 2 shows the structure of a radio frame in 3GPP LTE.

FIG. 2 shows the structure of a radio frame in 3GPP LTE. For the structure of the radio frame, reference can be made to Section 6 of 3GPP TS 36.211 V8.5.0 (2008-12) "Evolved Universal Terrestrial Radio Access (E-UTRA); Physical Channels and Modulation (Release 8)". The radio frame consists of 10 subframes assigned respective indices 0 to 9. One subframe consists of 2 slots. The time taken to transmit one subframe is called a TTI (transmission time interval). For example, the length of one subframe may be 1 ms, and the length of one slot may be 0.5 ms.

One slot may include a plurality of OFDM (orthogonal frequency division multiplexing) symbols in the time domain. The OFDM symbol is used to represent one symbol period in the time domain because 3GPP LTE adopts OFDMA (orthogonal frequency division multiplexing) symbols in downlink, but not limited to a multi-access scheme or a name. For example, the OFDM symbol may be called another terminology, such as an SC-FDMA (single carrier frequency division multiple access) symbol or a symbol period.

One slot is illustrated to include 7 OFDM symbols, but the number of OFDM symbols included in one slot may be changed according to the length of a CP (Cyclic Prefix). In accordance with 3GPP TS 36.211 V8.5.0 (2008-12), one subframe includes 7 OFDM symbols in a normal CP and includes 6 OFDM symbols in an extended CP.

A resource block (RB) is a unit of resource allocation and includes a plurality of subcarriers over one slot. For example, assuming that one slot includes 7 OFDM symbols in the time domain and the resource block includes 12 subcarriers in the frequency domain, one resource block may include 7×12 resource elements (REs).

A PSS (Primary Synchronization Signal) is transmitted through the last OFDM symbols of a first slot (i.e., the first slot of a first subframe (a subframe having an index 0)) and an eleventh slot (i.e., the first slot of a sixth subframe (a subframe having an index 5)). The PSS is used to obtain OFDM symbol synchronization or slot synchronization and associated with a physical cell ID (identity). A PSC (Primary Synchronization Code) is a sequence used for the PSS. Three PSCs are included in 3GPP LTE. One of the three PSCs is transmitted as the PSS according to a cell ID. The same PSC is used in the last OFDM symbols of the first slot and the eleventh slot.

An SSS (Secondary Synchronization Signal) includes a first SSS and a second SSS. The first SSS and the second SSS are transmitted through an OFDM symbol contiguous to an OFDM symbol through which the PSS is transmitted. The SSS is used to obtain frame synchronization. The SSS, together with the PSS, is used to obtain a cell ID. The first SSS and the second SSS use different SSCs (Secondary Synchronization Codes). Assuming that each of the first SSS and the second SSS includes 31 subcarriers, two SSCs each having a length of 31 are used in the first SSS and the second SSS, respectively.

A PBCH (Physical Broadcast Channel) is transmitted over the former four OFDM symbols of the second slot of a first subframe. The PBCH carries pieces of essential system information necessary for UE to communicate with a BS. System information transmitted through the PBCH is called an MIB (master information block). On the other hand, system information transmitted through a PDCCH (Physical Downlink Control Channel) is called an SIB (system information block).

As disclosed in 3GPP TS 36.211 V8.5.0 (2008-12), LTE divides physical channels into a PDSCH (Physical Downlink Shared Channel) and a PUSCH (Physical Uplink Shared Channel) which are data channels and a PDCCH (Physical Downlink Control Channel) and a PUCCH (Physical Uplink Control Channel) which are control channels. Furthermore, downlink control channels include a PCFICH (Physical Control Format Indicator Channel) and a PHICH (Physical Hybrid-ARQ Indicator Channel).

Control information transmitted through a PDCCH is called downlink control information (DCI). The DCI may include the resource allocation of a PDSCH (this is also called a downlink grant), the resource allocation of a PUSCH (this is also called an uplink grant), a set of transmit power control command for individual UEs within a certain UE group, and/or the activation of the VoIP (Voice over Internet Protocol).

Figure 3:
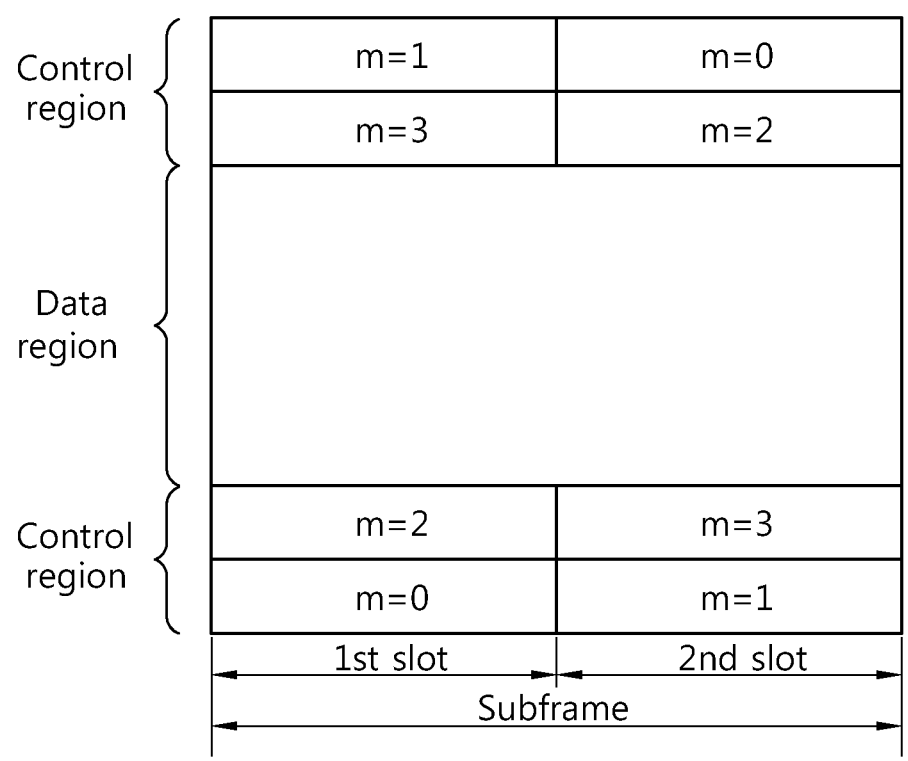
FIG. 3 shows an example of an uplink subframe in 3GPP LTE.

FIG. 3 shows an example of an uplink subframe in 3GPP LTE. The uplink subframe may be divided into a control region to which a PUCCH (Physical Uplink Control Channel) carrying uplink control information is allocated and a data region to which a PUSCH (Physical Uplink Shared Channel) carrying uplink data is allocated.

The PUCCH for one UE is allocated as a resource block pair in a subframe. Resource blocks belonging to the resource block pair occupy different subcarriers in a first slot and a second slot. 'm' is a position index indicating a logical frequency domain position of the resource block pair allocated to the PUCCH within the subframe. It shows that the resource blocks having the same m value occupy different subcarriers in two slots.

Figure 4:
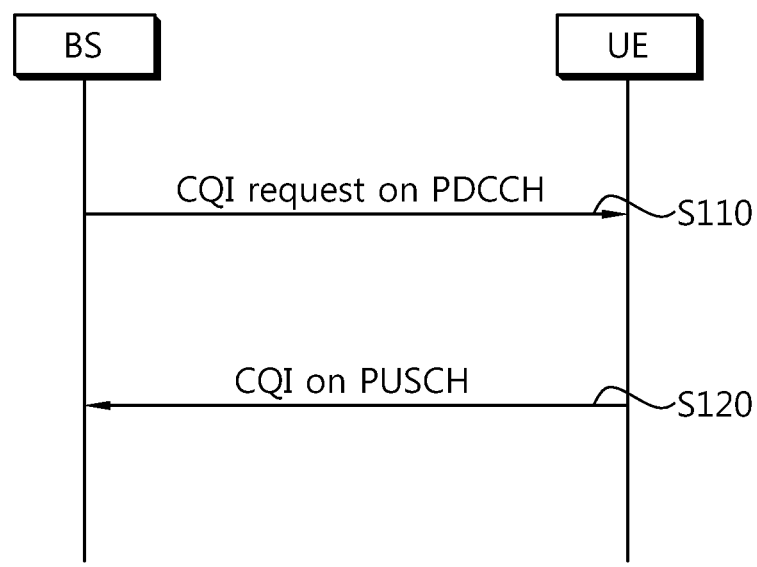
FIG. 4 is a flowchart illustrating a method of reporting an aperiodic CQI in 3GPP LTE.

FIG. 4 is a flowchart illustrating a method of reporting an aperiodic CQI in 3GPP LTE. An aperiodic CQI is a CQI reported by UE at the request of a BS, and a periodic CQI is a CQI reported in a predetermined cycle without a request from a BS.

A BS sends a CQI request to UE on a PDCCH (S110). As disclosed in Section 5.3.3.1.1 of 3GPP TS 36.212 V8.5.0 (2008-12), the CQI request is a field of 1 bit which is included in a DCI format 0 that is an uplink grant for PUSCH scheduling. Table 1 below shows an example of fields included in the DCI format 0.

TABLE 1

| FIELD NAME | DESCRIPTION |
| --- | --- |
| Uplink resource allocation | Resource allocation for PUSCH |
| CQI request | Triggering of CQI report request |

If the bit value of the CQI request is set to '1' in an nth subframe, the UE reports a CQI on a PUSCH in an (n+k)th subframe (S120). In FDD (Frequency Division Duplex), k=4. The PUSCH may be configured through an uplink grant included in the CQI request. That is, UE receives uplink resource allocation and a CQI request, multiplexes a CQI and uplink data using the uplink resource allocation, and sends them.

Figure 5:
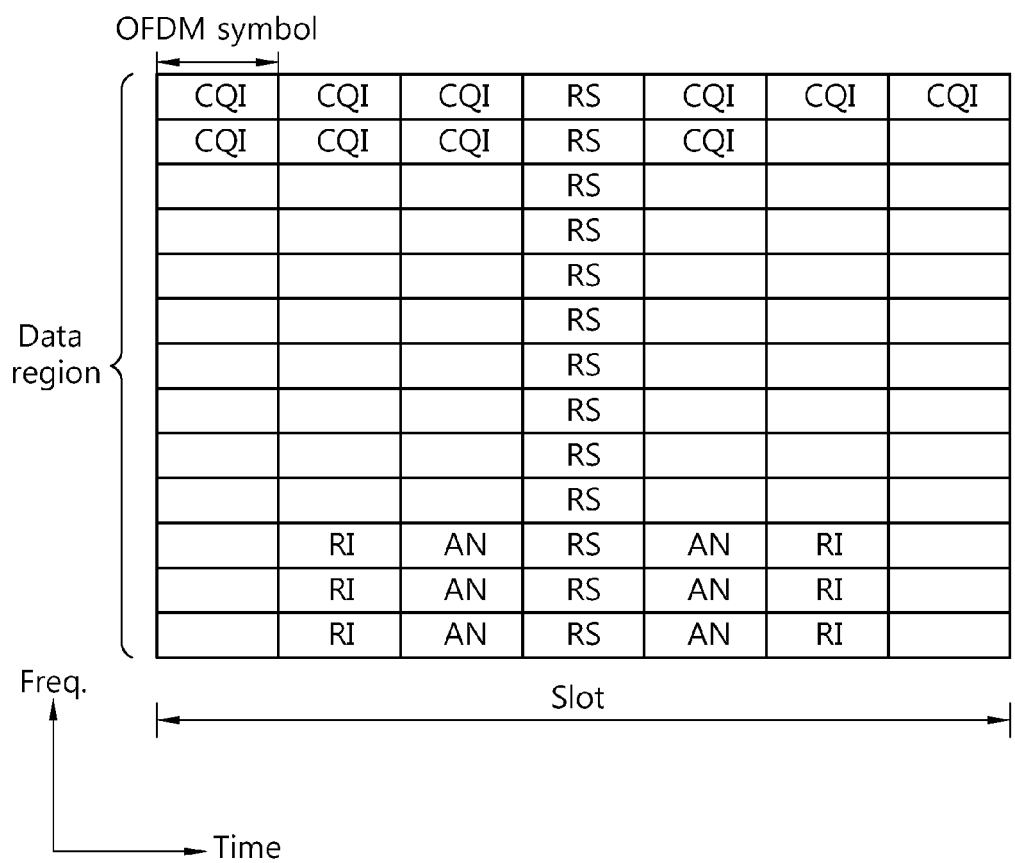
FIG. 5 shows CQI transmission on a PUSCH.

FIG. 5 shows CQI transmission on a PUSCH. An 'RS' allocated to an OFDM symbol placed at the center of a slot refers to a reference signal. A CQI is mapped to the upper part of a data region in a time-first manner. An 'AN' (i.e., an ACK/NACK signal for HARQ) and an RI (rank indicator) may also be transmitted on the PUSCH.

As disclosed in Section 7.2.1 of 3GPP TS 36.213 V8.5.0 (2008-12), in order to report the CQI, one of 6 modes in Table below is set as a reporting mode. The reporting mode is set in response to an RRC message.

TABLE 2

| | | PMI Feedback Type | | |
| --- | --- | --- | --- | --- |
| | | No PMI | Single PMI | Multiple PMI |
| CQI Feedback Type | Wideband CQI | | | Mode 1-2 |
| | Subband CQI (UE selected) | Mode 2-0 | | Mode 2-2 |
| | Subband CQI (higher layer configured) | Mode 3-0 | Mode 3-1 | |

The wideband CQI refers to a CQI over an entire band, and the subband CQI refers to a CQI over a subband of the entire band.

A CQI report in 3GPP LTE is based on a single carrier system in which a downlink carrier through which a CQI request is transmitted and an uplink carrier through which a CQI is transmitted are mapped to each other in an one-to-one way.

The CQI is hereinafter an index indicating a channel state. The CQI is also represented by an index of an MCS (modulation and coding) table, but may be represented using various formats, such as an interference level or a signal strength. Furthermore, the CQI may include a PMI (precoding matrix indicator) indicating an index of a precoding matrix and/or an RI (rank indicator) indicating a rank.

A multi-carrier system is now described.

A 3GPP LTE system supports a case where a downlink bandwidth and an uplink bandwidth are differently set. Here, one component carrier (CC) is a precondition for the case. This means that, in the state in which one CC is defined for each of downlink and uplink, 3GPP LTE supports a case where the downlink bandwidth is identical with or different from the uplink bandwidth. For example, the 3GPP LTE system may support a maximum of 20 MHz and have different uplink bandwidth and downlink bandwidth, but supports only one CC in uplink and downlink.

A spectrum aggregation (also called a bandwidth aggregation or a carrier aggregation) supports a plurality of CCs. The spectrum aggregation has been introduced in order to support an increased throughput, prevent an increase of costs due to the introduction of a wideband RF (radio frequency), and guarantee compatibility with the existing system. For example, if 5 CCs are allocated as the granularity of a carrier unit having a 20 MHz bandwidth, a maximum bandwidth of 100 MHz can be supported.

The spectrum aggregation may be divided into a contiguous spectrum aggregation in which an aggregation is performed between consecutive carriers and a non-contiguous spectrum aggregation in which an aggregation is performed between inconsecutive carriers, in the frequency domain. The number of carriers aggregated between downlink and uplink may be differently set. A case where the number of downlink carriers is identical with the number of uplink carriers is called a symmetric aggregation, and a case where the number of downlink carriers is different from the number of uplink carriers is called a symmetric aggregation.

CCs may have different sizes (i.e., bandwidths). For example, assuming that 5 CCs are used to configure a 70 MHz bandwidth, it may be configured using a 5 MHz carrier (carrier #0)+a 20 MHz carrier (carrier #1)+a 20 MHz carrier (carrier #2)+a 20 MHz carrier (carrier #3)+a 5 MHz carrier (carrier #4).

The term 'multi-carrier system' hereinafter refers to a system supporting multiple carriers based on the spectrum aggregation. In the multi-carrier system, a contiguous spectrum aggregation or a non-contiguous spectrum aggregation or both may be used, and any one of a symmetric aggregation and an asymmetric aggregation may be used.

Figure 6:
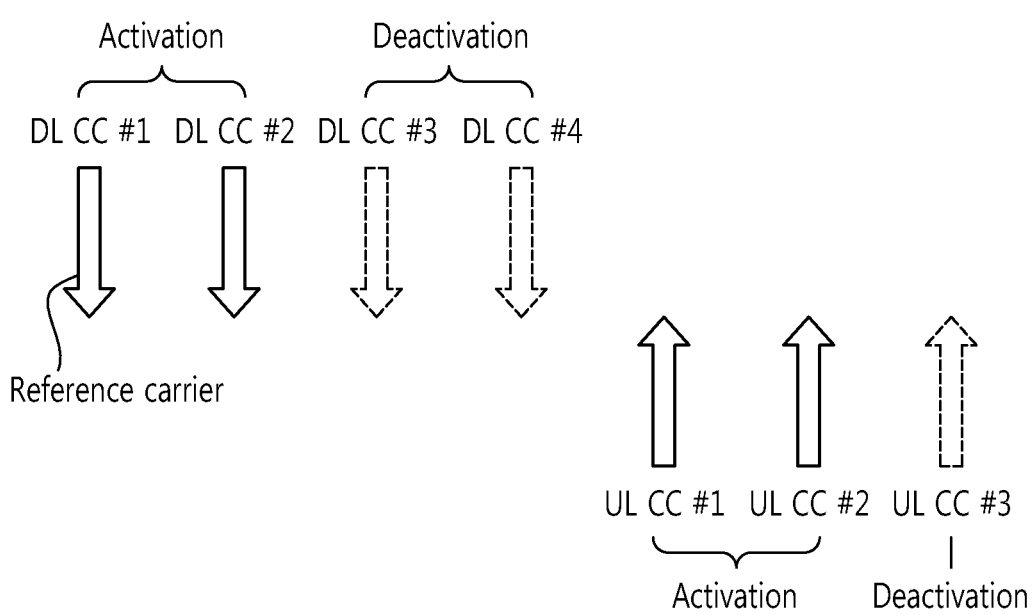
FIG. 6 shows an example in which multiple carriers are operated.

FIG. 6 shows an example in which multiple carriers are operated. Four DL CCs (i.e., a DL CC #1, a DL CC #2, a DL CC #3, and a DL CC #4) and three UL CCs (i.e., an UL CC #1, an UL CC #2, and an UL CC #3) are illustrated, but the number of CCs is not limited.

The DL CC #1 and the DL CC #2 of the four DL CCs are activated, which are called activated carriers. The DL CC #3 and the DL CC #4 are deactivated, which are called deactivated carriers. Furthermore, the UL CC #1 and the UL CC #2 of the three UL CCs are activated carriers, and the UL CC #3 thereof is an activated carrier.

The activated carrier is a carrier enabling the transmission or reception of control information or a data packet. The activated carrier does not enable the transmission or reception of a data packet, but enables a minimum operation, such as signal measurement.

The activated carrier and the activated carrier are not fixed, and each CC may be deactivated or activated through negotiations between a BS and UE. The activated carrier is also called a candidate carrier in that it can be activated.

At least one of the activated carriers may be set as a reference carrier. The reference carrier is also called an anchor carrier or a primary carrier. An activated carrier which is not the reference carrier is called as a secondary carrier. The reference carrier is a carrier in which control information is transmitted on a downlink control channel (e.g., a PDCCH) or in which common control information for multiple carriers is transmitted.

A mobility management message or a carrier activation/deactivation message may be transmitted through the reference carrier.

The reference carrier may be defined not only for downlink, but also for uplink. The uplink reference carrier may be used to send at least one of uplink control information (UCI), an HARQ ACK/NACK signal, an aperiodic CQI, and a periodic CQI. Furthermore, the uplink reference carrier may be used to perform handover and perform initial access, such as the transmission of a random access preamble.

Figure 7:
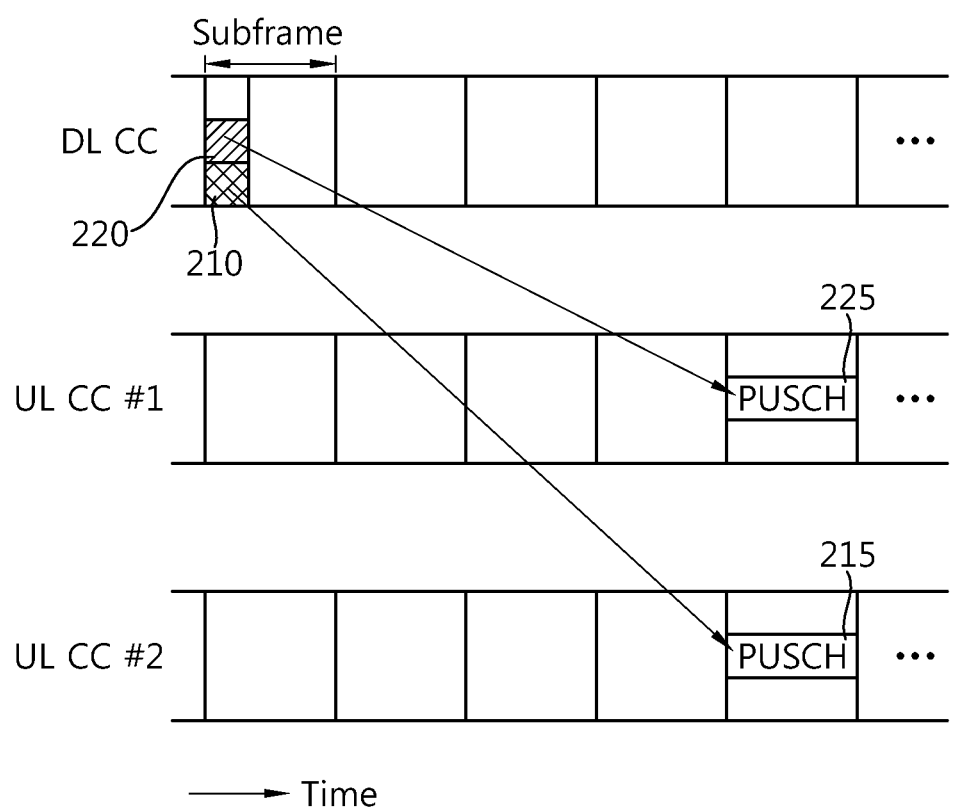
FIG. 7 shows an example of an operation in multiple carriers.

FIG. 7 shows an example of an operation in multiple carriers.

A BS sends a first uplink grant to UE on the first PDCCH 210 of a DL CC. The first uplink grant includes information about the resource allocation of a first PUSCH 215 of an UL CC #1.

The BS sends a second uplink grant to the UE on the second PDCCH 220 of the DL CC. The second uplink grant includes information about the resource allocation of the first PUSCH 225 of an UL CC #2.

The uplink grant may include a CIF (carrier indicator field) for indicating whether it is about an uplink grant for what UL CC. Alternatively, the UE may implicitly know an UL CC through the resources of a PDCCH on which the uplink grant is transmitted.

Figure 8:
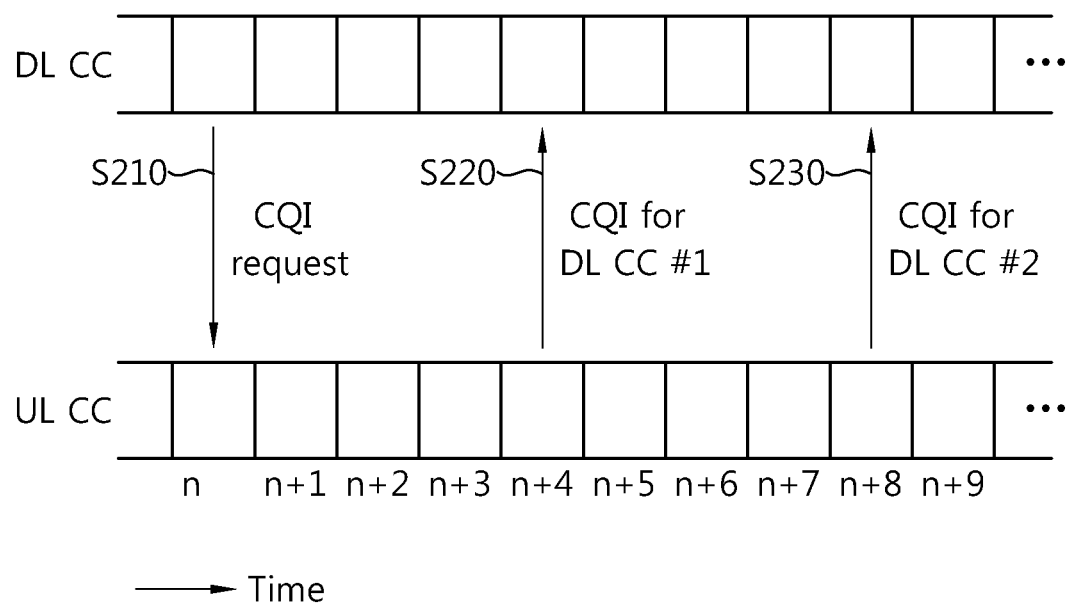
FIG. 8 is a flowchart illustrating a CQI report method according to an embodiment of the present invention.

FIG. 8 is a flowchart illustrating a CQI report method according to an embodiment of the present invention.

A BS sends a CQI request to UE (S210). The CQI request may be transmitted through a PDCCH as a part of DCI, but may be transmitted through an RRC message. Uplink resource allocation, together with the CQI request, may also be transmitted.

The UE sends a first CQI for a DL CC #1 on a PUSCH (S220). When the CQI request is received in an n-th subframe, the first CQI may be transmitted in an (n+k1)-th subframe, where k1>0. It is exemplarily shown as k1=4.

Next, the UE sends a second CQI for a DL CC #2 (S230). When the first CQI is transmitted in the (n+k1)-th subframe, the second CQI may be transmitted in an (n+k1+k2)-th subframe, where k2>0. It is exemplarily shown as k2=4.

When the CQI request is triggered while the uplink grant for each of the CCs is transmitted, the uplink grant for a CC not requiring the uplink grant may be unnecessarily transmitted in order to request the CQI report. When one CQI request is triggered, a CQI for CCs is transmitted over a plurality of subframes without an additional uplink grant.

If a DL CC is a deactivated carrier, a CQI may not be reported because an uplink grant cannot be transmitted. Accordingly, overhead due to the unnecessary transmission of the uplink grant can be prevented, and a CQI for a plurality of DL CCs can be transmitted through one uplink grant in order to schedule multiple carriers (the activation/deactivation of the carriers).

The offset (or period) k1 and/or k2 of a subframe through which the CQI is transmitted may be previously designated, but a BS may inform UE of the offset through an RRC message or DCI on a PDCCH.

A CQI request for UE may be independently triggered by the CC. Alternatively, one CQI request for a plurality of CCs may be triggered. UE may receive an uplink grant, including a CQI request, through one or more DL CCs.

A CQI is transmitted through two subframes (e.g., an (n+k1)-th subframe and an (n+k2)-th subframe), but the number of subframes is not limited thereto. The CQI may be transmitted through P subframes or subframes which are a multiple of P. The number P or period of subframes through which the CQI is reported may be previously designated, but a BS may inform UE of the number P or period of subframes through an RRC message or DCI on a PDCCH. The subframes may be spaced apart from one another at a certain offset interval or at different offset intervals.

Although a CQI for one DL CC is illustrated to be transmitted in one subframe, a CQI for a plurality of DL CCs may be transmitted. For example, the first CQI of the (n+k1)-th subframe may include a CQI for the DL CC #1 and the DL CC #3, and the second CQI of the (n+k1+k2)-th subframe may include a CQI for the DL CC #2 and the DL CC #4.

The order of the DL CCs whose CQI is reported may be previously designated, or a BS may send the order of the DL CCs for reporting the CQI to UE. For example, UE may send a CQI for a plurality of DL CCs on the basis of a DL CC through which a CQI request is transmitted. Alternatively, UE may send CQIs according to a previously designated report order irrespective of a DL CC through which a CQI request is transmitted.

The CQI reporting mode may be the same in CCs or may be different in CCs. For example, it is assumed that the DL CC #1 is an activated carrier for performing dynamic scheduling to UE on a subband basis and the DL CC #2 is a deactivated carrier. A subband CQI for the DL CC #1 is reported, and a wideband CQI for the DL CC #2 is reported.

A BS may set the CQI reporting mode for each CC along with the CQI request or higher layer signaling.

A UE may override the CQI reporting mode set by the BS. For example, the reporting mode is set so that the subband CQI for the DL CC #2 is reported, but if the current DL CC #2 has been deactivated, the UE reports the wideband CQI.

As in the conventional 3GPP LTE, the CQI request may be a field that has 1 bit and triggers the CQI report. When the CQI request is received, UE reports a CQI for an activated carrier or a deactivated carrier or both. Here, whether a CQI for what DL CC will be reported may be ambiguous because one uplink grant exists.

A DL CC whose CQI is reported may be determined using the following schemes.

As a first embodiment, a CQI for a DL CC through which an uplink grant is transmitted is reported. This is assumed to be a reference DL CC. Here, there is a linked UL CC linked to the reference DL CC. The linked UL CC is an UL CC through which a PUSCH is transmitted using the uplink grant. There may be the linked UL CC and a plurality of linked DL CCs. UE reports a CQI for the plurality of DL CCs.

For example, it is assumed that there are a DL CC #1, a DL CC #2, a DL CC #3, a DL CC #4, a DL CC #5, and an UL CC #1 and an UL CC #2. It is also assumed that the UL CC #1 is linked to the DL CC #1, the DL CC #2, and the DL CC #3, and the UL CC #2 is linked to the DL CC #4 and the DL CC #5. In the 'link', an uplink grant received through the DL CC #1, the DL CC #2, or the DL CC #3 is used by the linked UL CC #1. If an uplink grant including a CQI request is received through the DL CC #1, a UE sends a CQI for not only the DL CC #1, but also the DL CC #2 and the DL CC #3.

The report of a CQI may be performed according to the sequence of physical/logical indices of DL CCs. For example, in the above example, a CQI for the DL CC #1 becomes the first CQI of an (n+k1)-th subframe, a CQI for the DL CC #2 becomes the second CQI of an (n+k1+k2)-th subframe, and a CQI for the DL CC #3 becomes the third CQI of an (n+k1+k2+k3)-th subframe.

As a second embodiment, a BS may inform UE of a report list regarding DL CCs whose CQI will be reported. The report list may be transmitted through part of system information or through higher layer signaling, such as an RRC message.

As a third embodiment, the CQI request may include information about a DL CC whose CQI will be reported. For example, an uplink grant may be configured as in Table 3 below.

TABLE 3

| FIELD NAME | DESCRIPTION |
| --- | --- |
| Uplink resource allocation | Resource allocation for PUSCH |
| CQI request index 1 | Index of first DL CC whose CQI will be reported |
| CQI request index 2 | Index of second DL CC whose CQI will be reported |

The index of a DL CC whose CQI will be reported may be a physical index or a logical index. The CQI index 2 may be a value relative to the CQI index 1.

Alternatively, a CQI request may include the bitmap of DL CCs whose CQI will be reported. For example, an uplink grant may be configured as in Table 4 below.

TABLE 4

| FIELD NAME | DESCRIPTION |
| --- | --- |
| Uplink resource allocation | Resource allocation for PUSCH |
| CQI request | 1 bit field to trigger CQI report |
| CQI report bitmap | Bitmap to indicate DL CC through which CQI will be reported |

An UL CC through which a PUSCH for an aperiodic CQI is transmitted may be an UL CC linked to a DL CC through which an uplink grant is transmitted. Alternatively, an UL CC through which a PUSCH for an aperiodic CQI is transmitted may be an UL CC for a single reference carrier or may be an UL CC that is additionally allocated to UE by a BS for CQI transmission.

If an UL CC through which a PUSCH for an aperiodic CQI is transmitted is an UL reference carrier, the reference carrier may be a single reference carrier that is UE-specifically configured. Furthermore, the reference carrier may be the same as a carrier that is used to send an HARQ ACK/NACK signal on a PUCCH.

Figure 9:
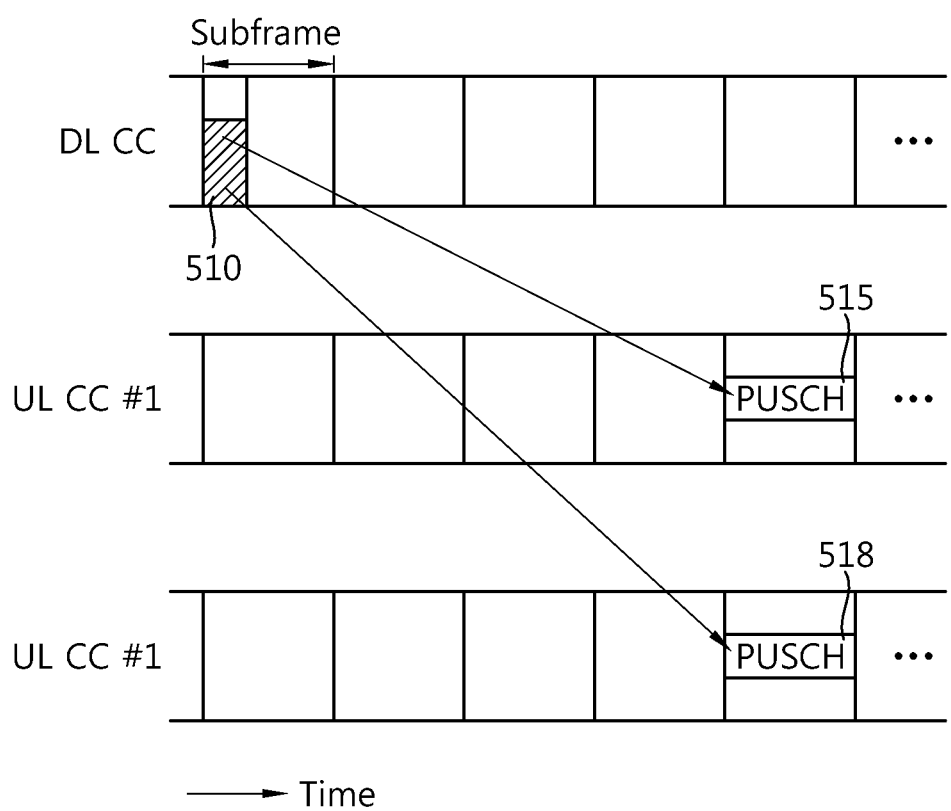
FIG. 9 shows an example of a joint-coded PDCCH.

FIG. 9 shows an example of a joint-coded PDCCH. Joint coding means that DCI on a PDCCH includes a plurality of uplink grants for a plurality of carriers. Meanwhile, what one uplink grant is transmitted on a PDCCH as shown in FIG. 7 is called separate coding.

A BS sends, to UE, a first uplink grant for the first PUSCH 515 of an UL CC #1 and a second uplink grant for the second PUSCH 518 of an UL CC #2 on the PDCCH 510 of a DL CC.

The UE that has received CQI requests included in the first uplink grant or the second uplink grant or both sends a CQI for the plurality of DL CCs. The CQI for the plurality of DL CCs may be transmitted over a plurality of uplink subframes as disclosed in the embodiment of FIG. 8.

The CQI may be transmitted in P subframes or subframes which are a multiple of P. The number or period of subframes through which the CQI is reported may be previously designated, but a BS may inform UE of the number or period of subframes through an RRC message or DCI on a PDCCH.

A CQI for one DL CC or a CQI for a plurality of DL CCs may be transmitted through one PUSCH.

The order of DL CCs whose CQI is reported may be previously designated or a BS may send the order of DL CCs for reporting a CQI to UE. For example, UE may send a CQI for a plurality of DL CCs on the basis of a DL CC through which a CQI request is transmitted. Alternatively, UE may send CQIs according to a predetermined reporting order irrespective of a DL CC through which a CQI request is transmitted.

The CQI reporting mode may be the same in CCs or may be different in CCs. For example, it is assumed that the DL CC #1 is an activated carrier for performing dynamic scheduling to UE on a subband basis and the DL CC #2 is a deactivated carrier. A subband CQI for the DL CC #1 is reported, and a wideband CQI for the DL CC #2 is reported.

A BS may set the CQI reporting mode for each CC along with the CQI request or higher layer signaling.

A UE may override the CQI reporting mode set by the BS. For example, a BS has set the reporting mode so that the subband CQI for the DL CC #2 is reported. If the current DL CC #2 has been deactivated, however, the UE reports the wideband CQI.

Although a plurality of uplink grants is transmitted on the PDCCH 510, only a CQI request of 1 bit may be transmitted. In this case, the PDCCH 510 may report a CQI for a plurality of DL CCs that are subjected to joint coding.

If a CQI request is 1 bit although a plurality of uplink grants exists, whether a CQI for what DL CC will be reported may be ambiguous. A DL CC whose CQI is reported may be determined using the following various schemes in order to determine a DL CC.

As a first embodiment, a CQI for one DL CC or a plurality of DL CCs through which a plurality of uplink grants is transmitted is reported. Furthermore, if there is a linked UL CC linked to a plurality of DL CCs, a CQI for other DL CCs linked to the linked UL CC may be reported. The report of the CQI may be performed according to the sequence of physical/logical indices of DL CCs.

As a second embodiment, a BS may inform UE of a report list regarding DL CCs whose CQI will be reported. The report list may be transmitted through part of system information or through higher layer signaling, such as an RRC message.

As a third embodiment, a CQI request may include information about a DL CC whose CQI will be reported. For example, the index or bitmap of a DL CC whose CQI will be reported, together with a plurality of uplink grants, may be transmitted on a PDCCH.

In a multi-carrier system, a BS may evaluate a channel state using various methods, and thus the reporting mode of a CQI may be changed. For example, a CQI for scheduling within a carrier is obtained from a measurement result in the frequency/time domain within the carrier. A CQI for scheduling between a plurality of carriers is obtained from a measurement result for each carrier. A CQI for intercell scheduling is obtained from a measurement result for a plurality of cells.

Although at least one of the 6 modes disclosed in 3GPP TS 36.213 V8.5.0 (2008-12) and described as the reporting modes may be used, a new reporting mode may be defined.

A reporting mode for reporting the CQI for scheduling within a carrier may be configured to include best-M selection information for utilizing a subband CQI and frequency selectivity.

A reporting mode for reporting the CQI for scheduling between a plurality of carriers is for carrier selection scheduling and may be configured to include minimum information indicating the channel condition of each carrier, such as a wideband CQI, a wideband PMI, and/or a wideband RI. The CQI for scheduling between a plurality of carriers may be reported aperiodically, but may be reported periodically. In the periodic report, a relatively long reporting period may be set because scheduling between a plurality of carriers is not frequently performed. The period may be previously designated or may be transferred through higher layer signaling. When a periodic CQI is transmitted, a PUSCH may be used. If there are available resources, a PUCCH may be used.

A reporting mode for the CQI for intercell scheduling may be configured to include a measurement result for peripheral cells in order to perform an operation, such as CoMP (Coordinated Multipoint Transmission). The reporting mode may include the signal intensity of a peripheral cell, a measurement result according to a specific criterion, and/or propagation delay-related information about the signal of peripheral cell. The CQI for intercell scheduling may be reported aperiodically, but may be reported periodically. In the periodic report, a relatively long reporting period may be configured because scheduling between a plurality of carriers is not frequently performed. The period may be previously designated or may be transferred through higher layer signaling. When a periodic CQI is transmitted, a PUSCH may be used. If there are available resources, a PUCCH may be used.

In a multi-carrier system, a CQI report may be performed by setting a reporting mode for a CQI through an RRC message and by triggering a CQI request through the 1 bit field of a PDCCH. Alternatively, the reporting mode may be dynamically set on a PDCCH.

The reporting mode may be implicitly set according to the DCI format of a PDCCH. For example, if the DCI format is related to CoMP, the reporting mode is set for intercell scheduling. If the DCI format is related to multiple carriers, the reporting mode is set for scheduling between a plurality of carriers.

The contents included in the CQI are now described.

In 3GPP LTE, a wideband CQI and a subband CQI are used as CQIs. It is however necessary to define a new CQI in order to support multiple carriers or CoMP.

When a CQI for multiple carriers is reported, the CQI may include at least one of the following CQIs.

(1) A multiple carrier wideband CQI: an average CQI value for all DL CCs or a plurality of DL CCs.

(2) A multiple carrier wideband PMI: an average PMI value for all DL CCs or a plurality of DL CCs.

(3) A multiple carrier wideband RI: an average RI value for all DL CCs or a plurality of DL CCs.

(4) A carrier selective CQI: A CQI for one or more DL CCs selected by UE, from among a plurality of DL CCs. The carrier selective CQI may include an index (e.g., CIF) or a bitmap for indicating the selected DL CCs. If the number of selected DL CCs is plural, the carrier selective CQI may be an average CQI. Alternatively, the carrier selective CQI may be represented by the best CQI value and a difference value based on the best CQI value.

(5) A carrier selective PMI: A PMI for one or more DL CCs selected by UE, from among a plurality of DL CCs. The carrier selective PMI may include an index or a bitmap for indicating the selected DL CCs. If the number of selected DL CCs is plural, the carrier selective PMI may be an average PMI. Alternatively, the carrier selective PMI may be represented by the best PMI value and a difference value based on the best PMI value.

When a CQI for CoMP is reported, the CQI may include at least one of the following CQIs. Hereinafter, a multi-cell is defined by a cell list shared between a BS and UE.

A multi-cell CQI: An average CQI for multiple cells. The average CQI may include a wideband CQI or a subband CQI or both.

(2) A multi-cell PMI: An average PMI for multiple cells. The average PMI may include a wideband PMI or a subband PMI or both.

(3) A multi-cell RI: an RI for multiple cells.

(4) A selective CQI: A CQI for one or more cells selected by UE, from among multiple cells. The selective CQI may include an index or a bitmap for indicating the selected cells. If the number of selected cells is plural, the selective CQI may be an average CQI. Alternatively, the selective CQI may be represented by the best CQI value and a difference value based on the best CQI value.

Figure 10:
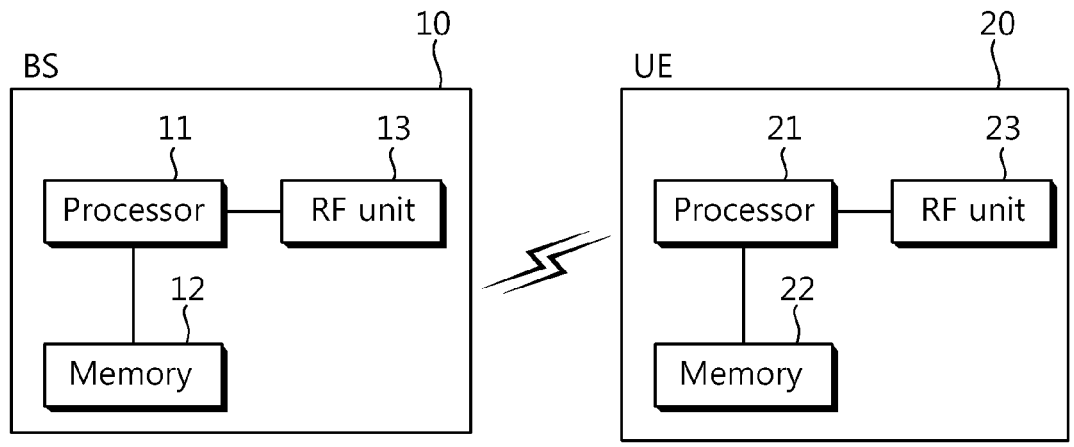
FIG. 10 is a block diagram showing a wireless communication system to implement an embodiment of the present invention.

(5) A selective PMI: A PMI for one or more cells selected by UE, from among multiple cells. The selective PMI may include an index or a bitmap for indicating the selected cells. If the number of selected cells is plural, the selective PMI may be an average PMI. Alternatively, the selective PMI may be represented by the best PMI value and a difference value based on the best PMI value FIG. 10 is a block diagram showing a wireless communication system to implement an embodiment of the present invention.

A BS 10 includes a processor 11, memory 12, and an RF(radio frequency) unit 13.

The processor 11 implements the proposed functions, processed, and/or methods. The operation of the BS 10 may be implemented by the processor 11. The processor 11 supports operations for multiple carriers and requests a CQI. The processor 11 may perform scheduling for carriers and cells based on a reported CQI.

The memory 12 is connected to the processor 11 and configured to store protocols or parameters for the operations for multiple carriers. The RF unit 13 is connected to the processor 11 and configured to send and/or receive a radio signal.

The UE 20 includes a processor 21, memory 22, and an RF unit 23.

The processor 21 implements the proposed functions, processed, and/or methods. The operation of the UE 20 may be implemented by the processor 21. The processor 21 supports operations for multiple carriers and reports a CQI for multiple carriers according to a CQI request.

The memory 22 is connected to the processor 21 and configured to store protocols or parameters for the operations for multiple carriers. The RF unit 23 is connected to the processor 21 and configured to send and/or receive a radio signal.

The processor 11, 21 may include Application-Specific Integrated Circuits (ASICs), other chipsets, logic circuits, and/or data processors. The memory 12, 22 may include Read-Only Memory (ROM), Random Access Memory (RAM), flash memory, memory cards, storage media and/or other storage devices. The RF unit 13, 23 may include a baseband circuit for processing a radio signal. When the above-described embodiment is implemented in software, the above-described scheme may be implemented using a module (process or function) which performs the above function. The module may be stored in the memory 12, 22 and executed by the processor 11, 21. The memory 12, 22 may be placed inside or outside the processor 11, 21 and connected to the processor 11, 21 using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

The above-described embodiments include various aspects of examples. Although all possible combinations for describing the various aspects may not be described, those skilled in the art may appreciate that other combinations are possible. Accordingly, the present invention should be construed to include all other replacements, modifications, and changes which fall within the scope of the claims.

The invention claimed is:

1. A method of reporting a channel state in a multi-carrier system, the method comprising:
   receiving, by an user equipment from a base station, a Radio Resource Control (RRC) message including a reporting mode and a reporting list that identifies two or more downlink component carriers, among a plurality of downlink component carriers, that are subject to channel reporting,
   wherein the reporting list is expressed as a bit map and includes a first set of downlink component carriers of which a channel state is reported, and a second set of downlink component carriers of which the channel state is reported;
   receiving, by the user equipment from the base station, an uplink grant on a physical downlink control channel (PDCCH), the uplink grant including an uplink resource allocation and a channel quality indicator (CQI) request for an aperiodic CQI report,
   wherein the first and second sets of the downlink component carriers correspond to parts of the two or more downlink component carriers,
   if downlink component carriers belonging to the first set or the second set identified by the bit included in the CQI request includes a deactivated downlink component carrier, overriding a corresponding CQI request with respect to the deactivated downlink component carrier, and
   if the CQI request is for the aperiodic CQI report and includes a bit for indicating only the one of the first set and the second set in the reporting list, transmitting, by the user equipment to the base station on an uplink data channel corresponding to the uplink resource allocation, channel state information for only the first set or second set of downlink component carriers identified by the bit included in the CQI request and in accordance with the reporting mode, the channel state information including CQI.

2. The method of claim 1, wherein each downlink component carrier is defined by a center frequency.

3. The method of claim 1, wherein the reporting mode is one of a wideband CQI reporting mode, a subband CQI reporting mode, a single precoding matrix indicator (PMI) reporting mode, a multiple PMI reporting mode, and no PMI reporting mode.

4. The method of claim 3, wherein, if the reporting mode is the subband CQI reporting mode, the channel state includes CQI for M subbands, where the M is expressed as an integer and indicates the number of subbands.

5. The method of claim 1, further comprising:
   receiving, by the user equipment, from the base station, a message that indicates an activation of at least one downlink component carrier to aggregate the plurality of downlink component carriers between the user equipment and the base station.

6. The method of claim 5, wherein the aggregation of the downlink component carriers is supported up to 100 Mhz.

7. The method of claim 5, wherein the aggregation of the downlink component carriers is supported for contiguous downlink component carriers and non-contiguous downlink component carriers.

8. The method of claim 1, wherein the uplink data channel is a physical uplink shared channel (PUSCH).

9. The method of claim 1, wherein the reporting mode is for each of the two or more downlink component carriers.

10. The method of claim 1, wherein
    if the CQI request is for the aperiodic CQI report and if the CQI request is for an inter-cell scheduling for a coordinated multipoint transmission (CoMP), the CQI includes a signal strength of a neighbor cell, a measurement result according to a specific criterion and a propagation delay.

11. The method of claim 1,
    wherein the uplink data channel includes the CQI, a Hybrid Automatic Repeat request (HARQ) acknowledge/negative-acknowledge (ACK/NACK), a rank indicator (RI) and a reference signal (RS), and
    wherein the CQI is mapped onto an upper part of a frequency axis in an ascending manner of an orthogonal frequency division multiplexing (OFDM) symbol number index in a time axis,
    wherein the RI and the HARQ ACK/NACK are mapped onto a lower part of the frequency axis, and
    wherein the RS is mapped onto a center OFDM symbol in the time axis.

12. An user equipment of reporting a channel state in a multi-carrier system, the user equipment comprising:
    a radio frequency unit configured to transmit and receive radio signals; and
    a processor operatively coupled with the radio frequency unit and configured to:
       receive, from a base station, a Radio Resource Control (RRC) message including a reporting mode and a reporting list that identifies two or more downlink component carriers, among a plurality of downlink component carriers, that are subject to channel reporting,
       wherein the reporting list is expressed as a bit map and includes a first set of downlink component carriers of which a channel state is reported, and a second set of downlink component carriers of which the channel state is reported;
       receive, from the base station, an uplink grant on a physical downlink control channel (PDCCH), the uplink grant including an uplink resource allocation and a channel quality indicator (CQI) request for an aperiodic CQI report,
       wherein the first and second sets of the downlink component carriers correspond to parts of the two or more downlink component carriers,
       if downlink component carriers belonging to the first set or the second set identified by the bit included in the CQI request includes a deactivated downlink component carrier, overriding a corresponding CQI request with respect to the deactivated downlink component carrier, and
       if the CQI request is for the aperiodic CQI report and includes a bit for indicating only one of the first set and the second set, transmit, to the base station on an uplink data channel corresponding to the uplink resource allocation, channel state information for only the first set or second set of downlink component carriers identified by the channel state information and in accordance with the reporting mode, the channel state information including CQI.

13. The user equipment of claim 12, wherein each downlink component carrier is defined by a center frequency.

14. The user equipment of claim 12, wherein the reporting mode is one of a wideband CQI reporting mode, a subband CQI reporting mode, a single precoding matrix indicator (PMI) reporting mode, a multiple PMI reporting mode, and no PMI reporting mode.

15. The user equipment of claim 14, wherein, if the reporting mode is the subband CQI reporting mode, the channel state includes CQI for M subbands, where the M is expressed as an integer and indicates the number of subbands.

16. The user equipment of claim 12, wherein the processor is configured for receiving from the base station, a message that indicates an activation of at least one downlink component carrier to aggregate the plurality of downlink component carriers between the user equipment and the base station.

17. The user equipment of claim 16, wherein the aggregation of the downlink component carriers is supported up to 100 Mhz.

18. The user equipment of claim 16, wherein the aggregation of the downlink component carriers is supported for contiguous downlink component carriers and non-contiguous downlink component carriers.

19. The user equipment of claim 12, wherein the uplink data channel is a physical uplink shared channel (PUSCH).

20. The user equipment of claim 12, wherein the reporting mode is for each of the two or more downlink component carriers.

* * * * *